United States Patent
Tang et al.

(10) Patent No.: US 8,514,812 B2
(45) Date of Patent: Aug. 20, 2013

(54) METHOD FOR TRANSITIONING OF STATE MACHINES AFTER RADIO ACCESS NETWORK IS RESELECTED AND TERMINAL

(75) Inventors: Chunmei Tang, Shenzhen (CN); Mingxia Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 356 days.

(21) Appl. No.: 12/883,928

(22) Filed: Sep. 16, 2010

(65) Prior Publication Data

US 2011/0069675 A1    Mar. 24, 2011

(30) Foreign Application Priority Data

Sep. 18, 2009  (CN) .......................... 2009 1 0175577

(51) Int. Cl.
*H04W 4/00*        (2009.01)
(52) U.S. Cl.
USPC ......................................................... 370/331
(58) Field of Classification Search
USPC ................. 370/328, 331, 352, 329, 330, 332, 370/333, 334, 335, 344; 455/422.1, 437, 455/436
See application file for complete search history.

(56) References Cited

U.S. PATENT DOCUMENTS

| | | | | |
|---|---|---|---|---|
| 2003/0135626 A1* | 7/2003 | Ray et al. | ...................... | 709/228 |
| 2009/0022104 A1* | 1/2009 | Cherian et al. | ................ | 370/331 |
| 2009/0073933 A1* | 3/2009 | Madour et al. | ................ | 370/331 |
| 2009/0147729 A1 | 6/2009 | Ulupinar et al. | | |
| 2009/0164658 A1 | 6/2009 | Prakash | | |

FOREIGN PATENT DOCUMENTS

| | | |
|---|---|---|
| WO | WO 2007/076729 A1 | 7/2007 |
| WO | WO 2008/044215 A2 | 4/2008 |
| WO | WO 2009/037623 A2 | 3/2009 |

OTHER PUBLICATIONS

Office Action issued in corresponding Chinese Patent Application No. 200910175577.5, mailed Aug. 1, 2012.
International Search Report and Written Opinion of the International Searching Authority issued in corresponding PCT Patent Application No. PCT/CN2010/076731, mailed Dec. 16, 2010.
$3^{rd}$ Generation Partnership Project 2, "E-UTRAN—cdma2000 Connectivity and Interworking: Air Interface Specification" Revision 0, 3GPP2 C.S0087-0, May 15, 2009.

\* cited by examiner

*Primary Examiner* — Kibrom T Hailu
*Assistant Examiner* — Dady Chery
(74) *Attorney, Agent, or Firm* — Brinks Hofer Gilson & Lione (57) ABSTRACT

A method for transitioning of a state machine after a radio access network (RAN) is reselected includes: generating first information when a mobile terminal reselects from an HRPD network to an LTE network; after receiving the first information, setting, by a Signaling Adaptation Protocol (SAP) of the HRPD module air interface protocol, the TunnelModeEnabled parameter to a first identifier, so that air interface related sub-protocols of an HRPD module know that the mobile terminal has reselected to the LTE network.

8 Claims, 13 Drawing Sheets

METHOD FOR TRANSITIONING OF STATE MACHINES AFTER RADIO ACCESS NETWORK IS RESELECTED AND TERMINAL

CROSS REFERENCE TO RELATED APPLICATION

This application claims priority to Chinese Patent Application No. 200910175577.5, filed on Sep. 18, 2009, which is hereby incorporated by reference in its entirety.

FIELD OF THE APPLICATION

The present application relates to the communication field, and in particular, to a method for transitioning of a state machine after a radio access network (RAN) is reselected and a terminal.

BACKGROUND OF THE APPLICATION

At present, the code division multiple access (CDMA) system draws extensive attention. More and more researches on the CDMA system are being carried out. The high data rate (HDR) technology, which is also called high rate packet data (HRPD) or 1×EV-DO, is one of 3G technology standards.

In addition, the long term evolution (LTE) technology is considered as the mainstream technology for 4G mobile communication systems. An LTE system uses the orthogonal frequency division multiple access (OFDMA) and multiple input multiple output (MIMO) technologies, thus greatly improving the spectrum utilization and capacity of the communication system. Further, the LTE technology can better support large data download services such as the voice over IP (VoIP) or video calling service.

Because LTE is considered as the next generation mainstream technology, some CDMA operators decide to gradually upgrade the current HRPD network to the LTE network. Therefore, the HRPD and LTE networks may coexist for a long period of time.

The maturity of the multimode terminal paves the way for the interworking between different radio technology standards. A lot of standardization organizations carry out researches on the interworking between multiple radio access technologies, with the focus on the interworking between the HRPD and the evolved universal terrestrial radio access network (EUTRAN).

For the interworking between the HRPD and the EUTRAN, the most basic mobility management is based on the mobility protocol at the network layer. If the terminal has the ability to perform dual radio receiving/transmission, the mobility protocol at the network layer may meet the handover performance requirements of real-time services. If the terminal does not have the ability to perform dual radio receiving/transmission, the interworking between the 3rd Generation Partnership Project (3GPP) network and the non-3GPP network relies on only the mobility protocol at the network layer. Due to the access authentication and authorization of the target system, specific radio negotiation and configuration processes of the target access system, and long handover delay, the handover performance requirements of the real-time services cannot be satisfied. Thus, the handover is classified into the following two types: Type 1: non-optimized handover, and Type 2: optimized handover. The objective of the optimized handover is to reduce the handover delay and improve the performance by performing earlier access authentication and authorization and completing the specific radio negotiation and configuration processes of the target access system. Particularly, the handover between radio access networks (RANs) when the radio link of the air interface is idle is also called reselection.

During the implementation of the interworking between the HRPD and the EUTRAN, the inventor of the present application discovers at least the following problems in the prior art:

Currently, the standard for performing optimized handover from the LTE network to the HRPD network is basically determined, but the standard for performing optimized handover from the HRPD network to the LTE network is not perfect. Therefore, after the mobile terminal reselects from the HRPD network to the LTE network, the mobile terminal may perform a series of abnormal actions because air interface related sub-protocols of the HRPD module of the mobile terminal cannot know that the mobile terminal has already reselected from the HRPD network to the LTE network.

SUMMARY OF THE APPLICATION

Embodiments of the present application provide a method for transitioning of a state machine after the RAN is reselected and a terminal. In this way, after the mobile terminal reselects from the HRPD network to the LTE network, related protocols may know that the mobile terminal has already reselected from the HRPD network to the LTE network, ensuring that the mobile terminal performs normal actions subsequently.

To achieve the foregoing objective, the embodiments provide the following technical solution:

A method for transitioning of a state machine after the RAN is reselected includes:
  generating first information when a mobile terminal reselects from an HRPD network to an LTE network; and
  setting, by the SAP of the HRPD module air interface protocol, the TunnelModeEnabled parameter to a first identifier after receiving the first information, so that the air interface related sub-protocols of the HRPD module know that the mobile terminal has reselected to the LTE network.

A mobile terminal includes:
  a first information generating unit, configured to generate first information when the mobile terminal reselects from an HRPD network to an LTE network; and
  a SAP parameter setting unit, configured to receive the first information, and set the TunnelModeEnabled parameter of the SAP of the HRPD module air interface protocol to a first identifier, so that air interface related sub-protocols of the HRPD module know that the mobile terminal has reselected to the LTE network.

By using the method for transitioning of a state machine after the RAN is reselected and the terminal provided in the embodiments, first information is generated when the mobile terminal reselects from the HRPD network to the LTE network; after the SAP receives the first information, the SAP sets the TunnelModeEnabled parameter to the first identifier, so that the air interface related sub-protocols of the HRPD module know that the mobile terminal has reselected to the LTE network. In this way, after the terminal reselects from the HRPD network to the LTE network, related sub-protocols of the HRPD module can know that the terminal has reselected to the LTE network according to the TunnelModeEnabled parameter, ensuring that the terminal performs normal actions after reselecting to the LTE network.

BRIEF DESCRIPTION OF THE DRAWINGS

The accompanying drawings for describing the embodiments are provided. The drawings and the following descrip

DETAILED DESCRIPTION OF THE EMBODIMENTS

The technical solution is described below with reference to the accompanying drawings. The embodiments described below are merely exemplary, without covering all embodiments that fall within the scope of the claims. It is understood that persons having ordinary skill in the art can modify these embodiments without departing from the scope of the claims.

When optimizing handover between the CDMA network and the LTE network, a Signaling Adaptation Protocol (SAP) of an HRPD module air interface protocol may be responsible for checking whether the current terminal camps on the 11PRD network according to the TunnelModeEnabled parameter. For example, if TunnelModeEnabled is 0, it indicates that the terminal camps on the HRPD network; if TunnelModeEnabled is 1, it indicates that the terminal camps on the LTE network, that is, the terminal is in Tunnel mode. In Tunnel mode, the terminal establishes a relationship with the access network (AN) of the HRPD through the air interface of the LTE network and the core network (CN) to continue maintaining the unicast access terminal identifier (UATI) and session information of the HRPD network, so as to hand over from the LTE network back to the HRPD network.

Setting the TunnelModeEnabled parameter of the SAP to 0 or 1 may involve the following cases:

1. When the SAP is initialized, the TunnelModeEnabled parameter is set to 0 if the terminal determines that the current serving network is the HRPD network; the TunnelModeEnabled parameter is set to 1 if the terminal determines that the current serving network is the LTE network.

2. After the terminal reselects from the LTE network to the HRPD network, the TunnelModeEnabled parameter is set to 0.

3. When the terminal on the LTE network opens the virtual connection to establish a relationship with the AN unsuccessfully or completely, the TunnelModeEnabled parameter is set to 0 if the current serving network is the HRPD network; the TunnelModeEnabled parameter is set to 1 if the current serving network is the LTE network.

Figure 1:
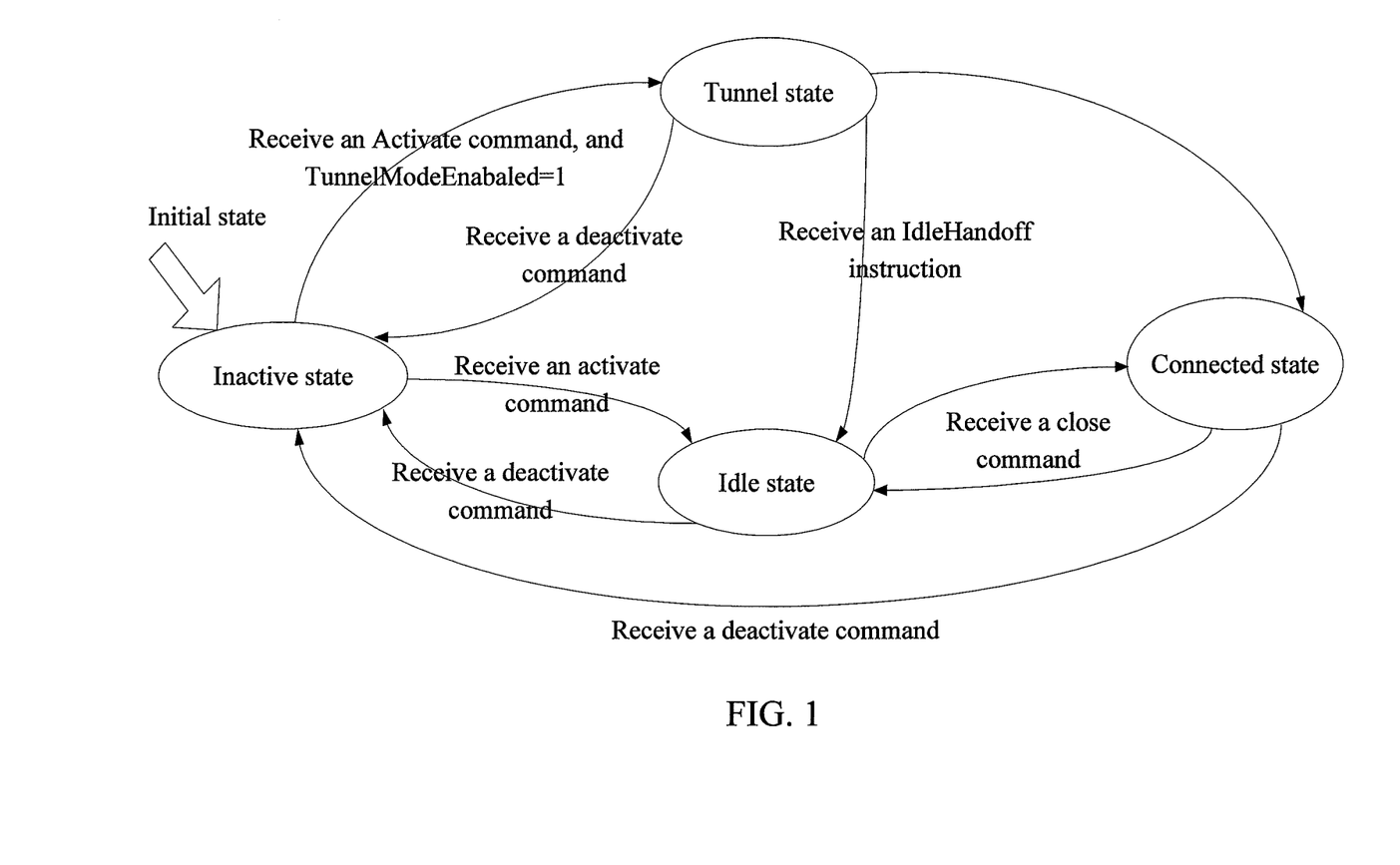
- FIG. 1 is a schematic diagram illustrating a route update protocol (RUP) state transition.
Figure 2:
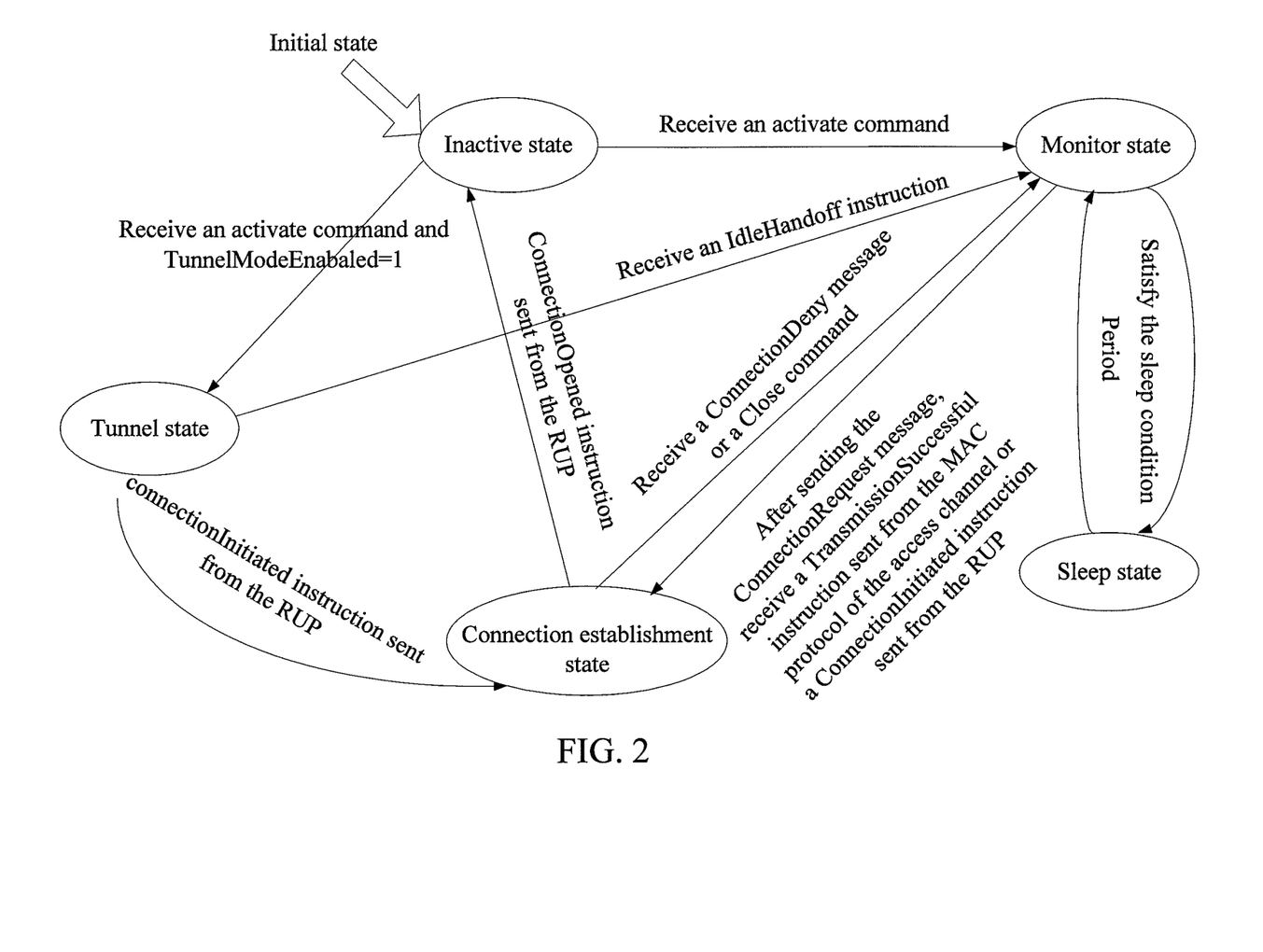
FIG. 2 is a schematic diagram illustrating an idle state protocol (ISP) state transition.
Figure 3:
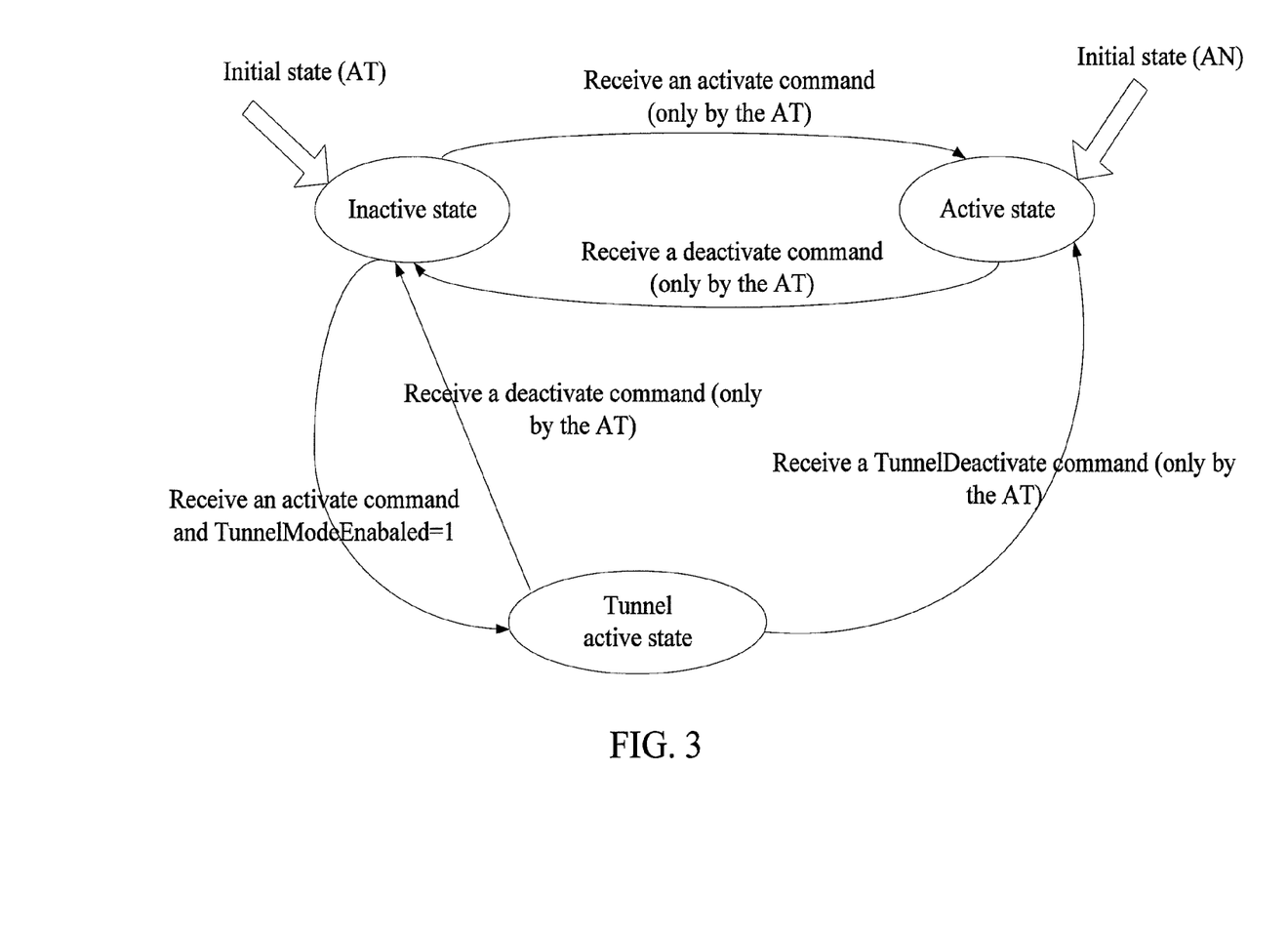
FIG. 3 is a schematic diagram illustrating an overhead messages protocol (OMP) state transition.

When the terminal camps on the LTE network, that is, the TunnelModeEnabled parameter of the SAP is 1, other air interface related sub-protocols of the HRPD module such as the Route Update Protocol (RUP), the Idle State Protocol (ISP), and the Overhead Messages Protocol (OMP) must be in the tunnel state (as shown in FIG. 1 to FIG. 3) so as to perform actions different from those of the terminal camping on the HRPD network.

As shown in FIG. 1, when the RUP receives an Activate command, the RUP enters the tunnel state if the TunnelModeEnabled parameter is 1; otherwise the RUP enters the idle state. When the terminal in the idle state hands over from the LTE network back to the HRPD network, the RUP transitions from the tunnel state back to the idle state after receiving an IdleHandoff indication.

As shown in FIG. 2, when the ISP receives an Activate command, the ISP enters the tunnel state if the TunnelModeEnabled parameter is 1; the ISP enters the monitor state if the TunnelModeEnabled parameter is not 1. When the terminal in the idle state hands over from the LTE network back to the HRPD network, the ISP transitions from the tunnel state back to the monitor state after receiving an IdleHandoff indication.

As shown in FIG. 3, when the OMP receives an Activate command, the OMP enters the tunnel active state; the OMP enters the active state if the TunnelModeEnabled parameter is not 1. When the terminal in the idle state hands over from the LTE network back to the HRPD network, the RUP transitions from the tunnel active state back to the active state after receiving a TunnelDeactivate command.

Figure 4:
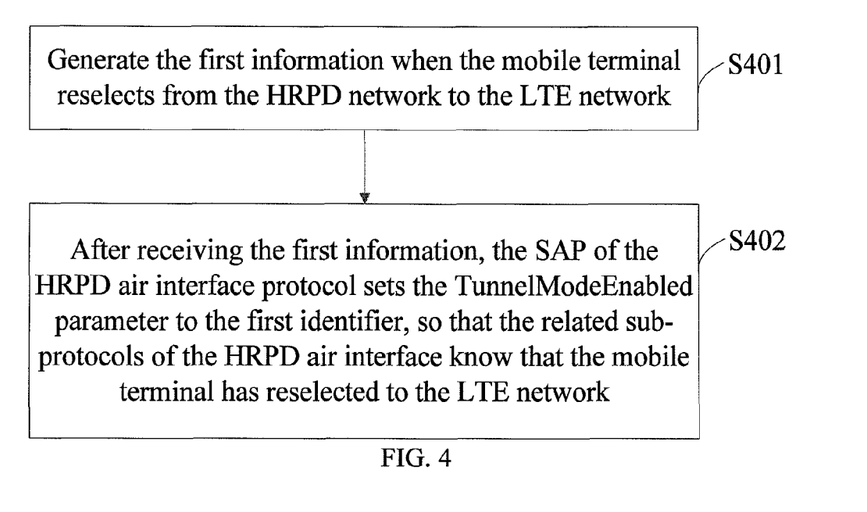
FIG. 4 is a flowchart of a method for transitioning of a state machine after the radio access network (RAN) is reselected in an embodiment.

An embodiment provides a method for transitioning of a state machine after the RAN is reselected. As shown in FIG. 4, the method includes the following steps:

Step S401: Generate the first information when the mobile terminal reselects from the HRPD network to the LTE network.

Specifically, the time when the terminal reselects from the HRPD network to the LTE network includes any time from the time of determining to reselect from the HRPD network to the LTE network to the time of reselecting from the HRPD network to the LTE network. The first information may be an indication or a command. For example, the first indication or command may be generated by the RUP, and may be a RUP.HandUpPrepared indication, indicating that the terminal determines to reselect to the LTE network.

Further, the RUP may generate the first indication or command according to parameter settings and the measurement result of forward link signal quality on the HRPD network and the LTE network or according to the notification from the network, or the HRPD module air interface protocol or the LTE module requesting the RUP to generate the first indication or command.

The following cases are involved:

(1) The RUP is responsible for judging whether to reselect to the LTE network. The judgment criterion may be the measurement result of the forward link signal quality on the HPRD network and the LTE network or other conditions.

Once the RUP determines to reselect to the LTE network, the RUP generates a RUP.HandUpPrepared indication.

(2) Other sub-protocols of the HRPD module air interface protocol are responsible for determining whether to reselect to the LTE network. For example, after the ISP determines to reselect to the LTE network, the ISP should notify the RUP of the determination of reselecting to the LTE network, for example, by sending an indication or a command. After the RUP receives the indication or command, the RUP generates a RUP.HandUpPrepared indication.

(3) The LTE module on the terminal is responsible for determining whether to reselect to the LTE network. After determining to reselect to the LTE network, the LTE module should notify the RUP of the determination of reselecting to the LTE network, for example, by sending an indication or a command. After the RUP receives the indication or command, the RUP generates a RUP.HandUpPrepared indication.

This embodiment is based on the fact that the RUP generates the first information RUP.HandUpPrepared. In fact, other protocols such as the ISP or the LTE module on the terminal may also generate the first information.

Step S402: After receiving the first information, the SAP of the HRPD module air interface protocol sets the TunnelModeEnabled parameter to the first identifier, so that the air interface related sub-protocols of the HRPD module know that the mobile terminal has reselected to the LTE network.

Specifically, in this embodiment, the first information is the RUP.HandUpPrepared indication generated by the RUP; after receiving the RUP.HandUpPrepared indication, the SAP sets the TunnelModeEnabled parameter to the first identifier. The first identifier may be 1, that is, the TunnelModeEnabled may be set to 1. Certainly, the first identifier may also be set to other values.

When setting the TunnelModeEnabled parameter, the SAP may judge the current RAT (optional). Specifically, after receiving the first information, the SAP may set the TunnelModeEnabled parameter to 1 if determining that the current serving RAT is LTE.

Further, after receiving the preceding RUP.HandUpPrepared indication, the OMP may also set the public parameter OverheadParametersUpToDate to a second identifier, where the second identifier may be 0, that is, the OverheadParametersUpToDate may be set to 0, so that the OMP can update the overhead message of the HRPD network correctly and immediately. Certainly, the second identifier may also be set to other values.

By using the method for transitioning of a state machine after the RAN is reselected in this embodiment, first information is generated when the mobile terminal reselects from the HRPD network to the LTE network; after the SAP receives the first information, the SAP sets the TunnelModeEnabled parameter to the first identifier, so that air interface related sub-protocols of the HRPD module know that the mobile terminal has reselected to the LTE network. In this way, after the terminal reselects from the HRPD network to the LTE network, related sub-protocols of the HRPD module can know that the terminal has reselected to the LTE network according to the TunnelModeEnabled parameter, ensuring that the terminal performs normal actions after reselecting to the LTE network.

Figure 5:
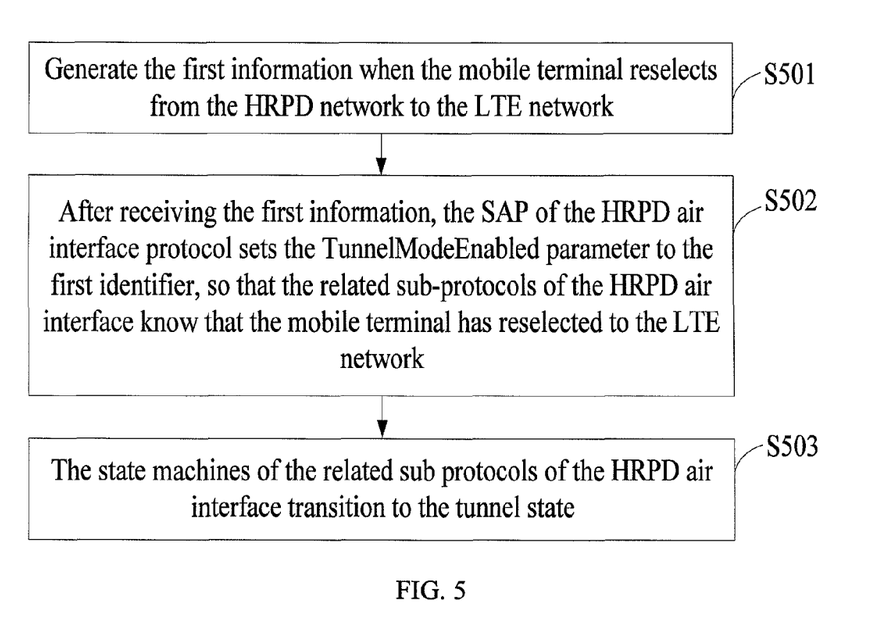
FIG. 5 is a flowchart of a method for transitioning of a state machine after the RAN is reselected in another embodiment.

Another embodiment provides a method for transitioning of a state machine after the RAN is reselected. As shown in FIG. 5, the method includes the following steps:

Step S501: Generate the first information when the mobile terminal reselects from the HRPD network to the LTE network.

Step S502: After receiving the first information, the SAP of the HRPD module air interface protocol sets the TunnelModeEnabled parameter to the first identifier, so that air interface related sub-protocols of the HRPD module know that the mobile terminal has reselected to the LTE network.

Steps S501 and S502 are the same as steps S401 and S402.

Step S503: The state machines of air interface related sub-protocols of the HRPD module transition to the tunnel state.

Specifically, the SAP or other HRPD module air interface protocols generate the second information; air interface related sub-protocols of the HRPD module receive the second information, and then enable the state machines to transition to the tunnel state.

When the TunnelModeEnabled parameter is set to the first identifier (that is, 1 in this embodiment), the SAP or other HRPD module air interface protocols generate second information that may be an indication or a command. For example, the SAP generates a SAP.IdleHandUP indication, indicating that the terminal will work in the LTE tunnel state and other related sub-protocols should also enter the LTE tunnel state.

This embodiment is based on the fact that the SAP generates the second information SAP.IdleHandUP. In fact, other protocols such as the Air Link Management Protocol (ALMP) may also generate the second information.

Air interface related sub-protocols of the HRPD module such as the RUP, the ISP, and the OMP receive the SAP.IdleHandUP indication, and enable the state machines to transition to the tunnel state.

Alternatively, air interface related sub-protocols of the HRPD module receive the first information, and then enable the state machines to transition to the tunnel state. In this embodiment, the first information refers to the RUP.HandUpPrepared indication. Therefore, after air interface related sub-protocols of the HRPD module such as the RUP, the ISP, and the OMP receive the RUP.HandUpPrepared indication, these protocols enable the state machines to transition to the tunnel state.

Alternatively, air interface related sub-protocols of the HRPD module query for the value of the TunnelModeEnabled parameter of the SAP. If determining that the TunnelModeEnabled parameter of the SAP is the first identifier (1 in this embodiment), these protocols enable the state machines to transition to the tunnel state.

Figure 6:
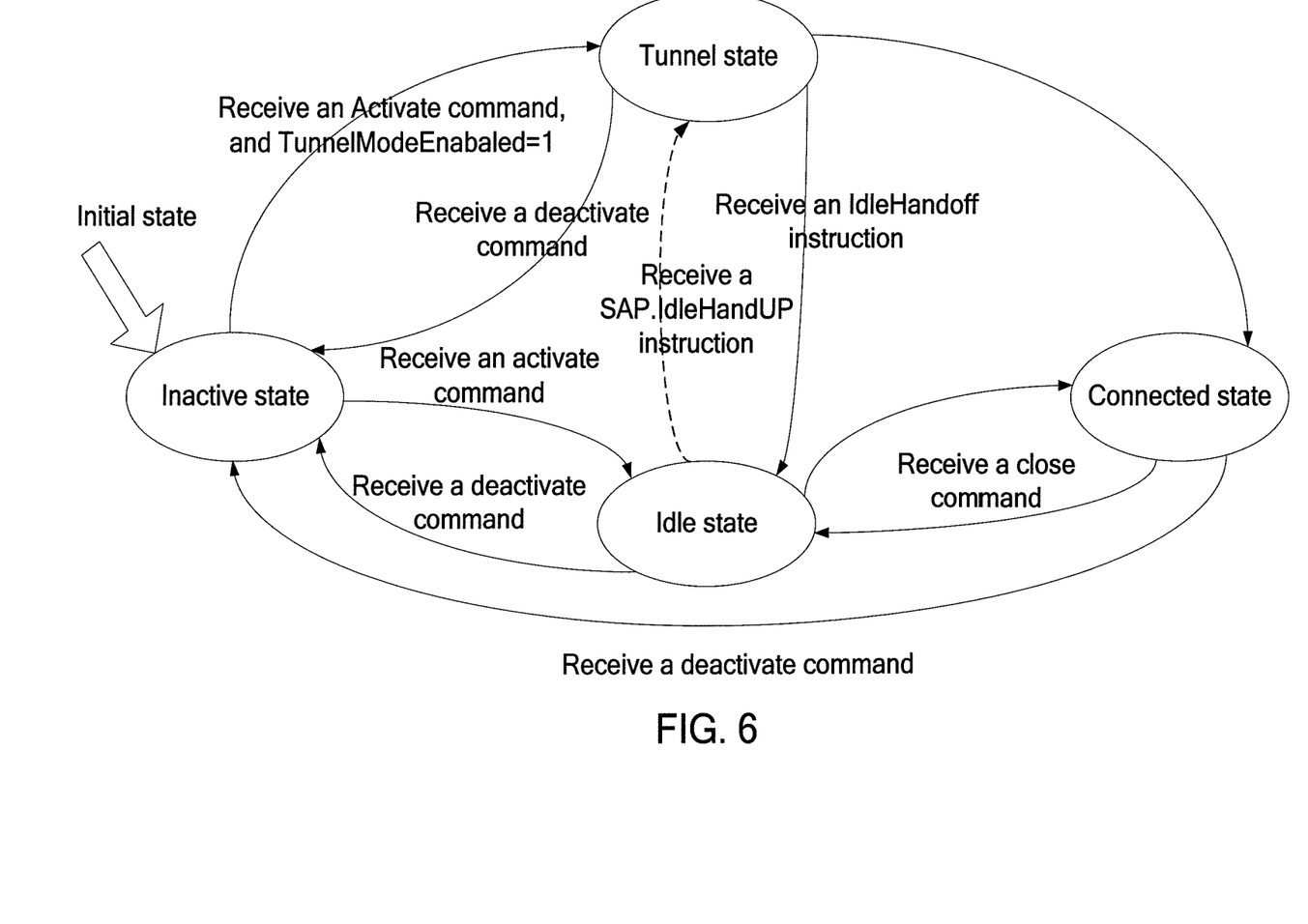
FIG. 6 is a schematic diagram illustrating the RUP state transition in an embodiment.

In this embodiment, assume that the SAP generates second information after setting the TunnelModeEnabled parameter to 1, where the second information may be an indication or a command, that is, the SAP generates a SAP.IdleHandUP indication. After receiving the SAP.IdleHandUPHRPD indication, air interface related sub-protocols of the HRPD module enable the state machines to transition to the tunnel state. Specifically, in this embodiment, after the RUP receives the SAP.IdleHandUP indication in the idle state, the RUP transitions from the idle state to the tunnel state. As shown by the dotted arrow in FIG. 6, a path for transitioning from the idle state to the tunnel state is added.

Figure 7:
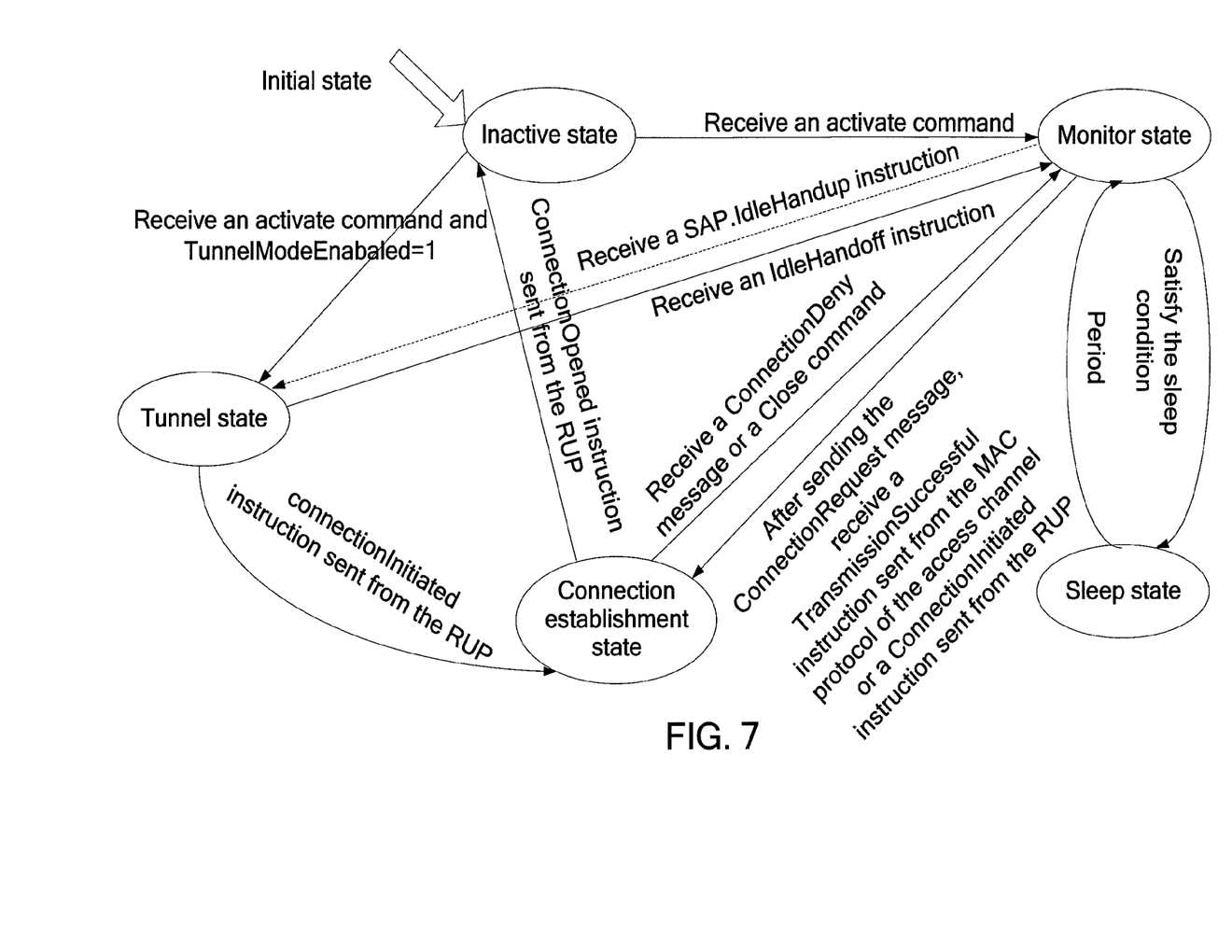
FIG. 7 is a schematic diagram illustrating the ISP state transition in an embodiment.

Alternatively, after receiving the SAP.IdleHandUP indication in the monitor state, the ISP transitions from the monitor state to the tunnel state. As shown by the dotted arrow in FIG. 7, a path for transitioning from the monitor state to the tunnel state is added. In addition, the ISP may receive the SAP.IdleHandUP indication in the sleep state, and then transition from the sleep state to the tunnel state.

Figure 8:
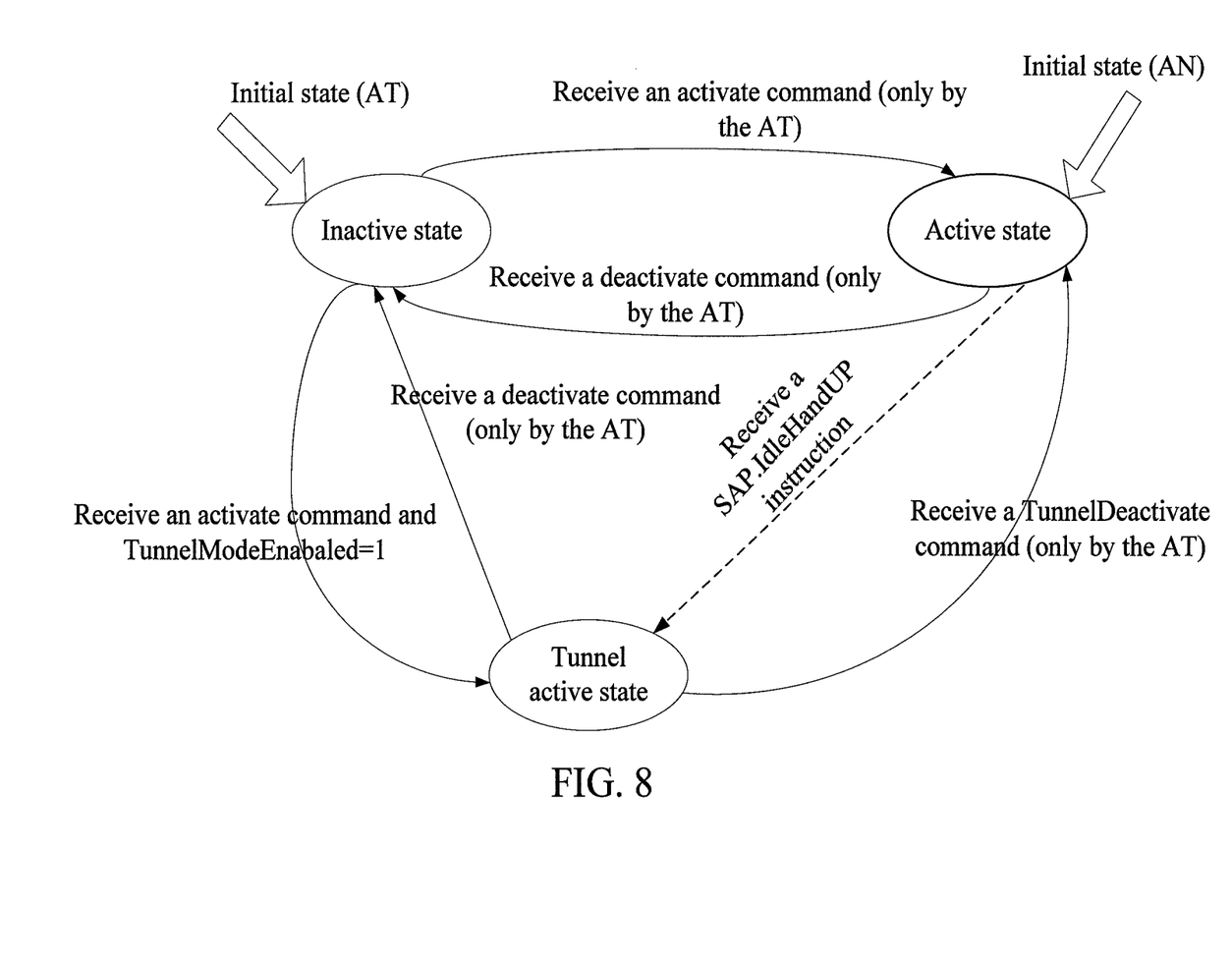
FIG. 8 is a schematic diagram illustrating the OMP state transition in an embodiment.

Alternatively, the OMP receives the SAP.IdleHandUP indication, and then transitions from the active state to the tunnel active state. As shown by the dotted arrow in FIG. 8, a path for transitioning from the active state to the tunnel active state is added.

Figure 9:
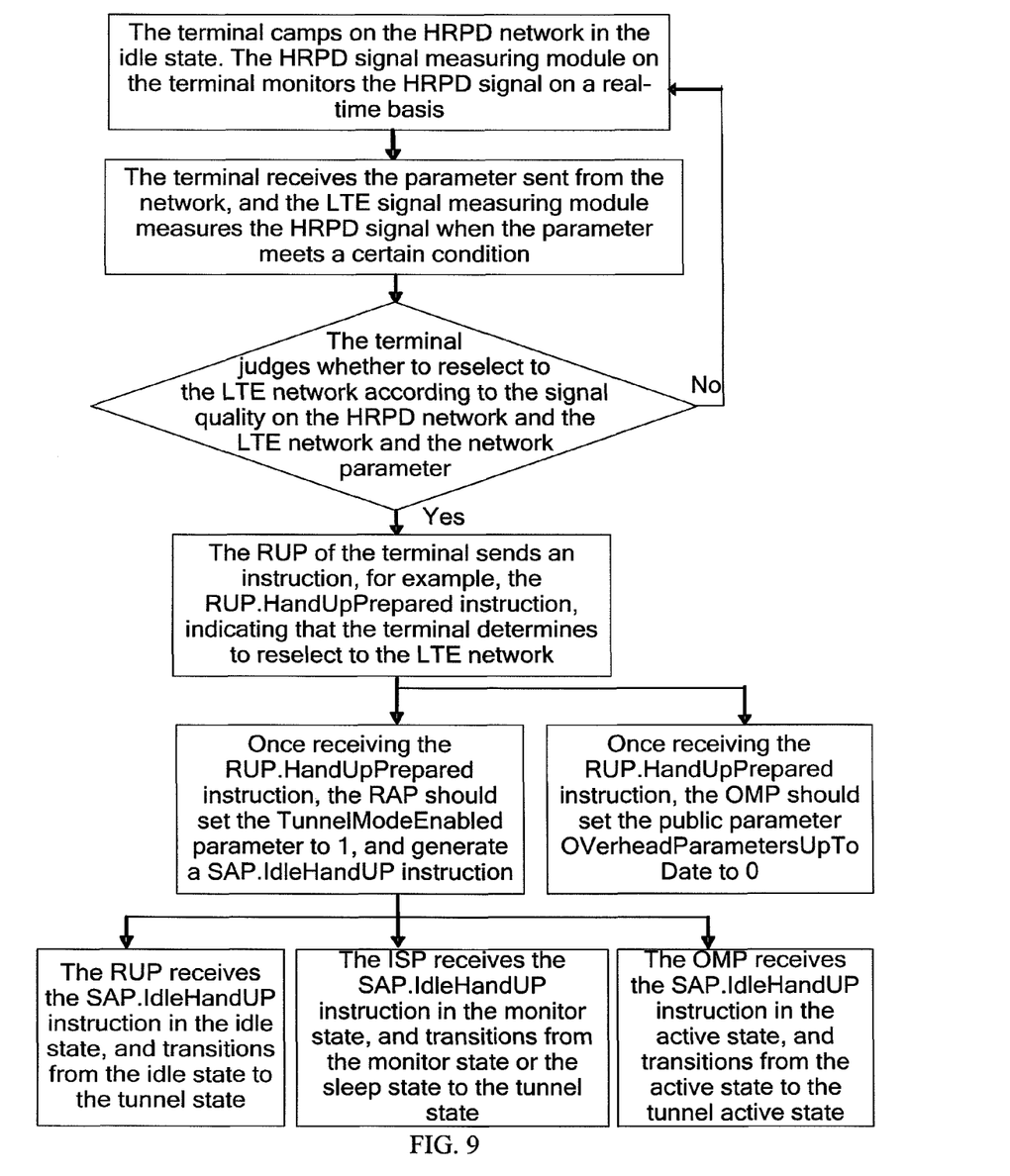
FIG. 9 is another flowchart of a method for transitioning of a state machine after the RAN is reselected in an embodiment.

The preceding process may also be represented by FIG. 9.

Figure 10:
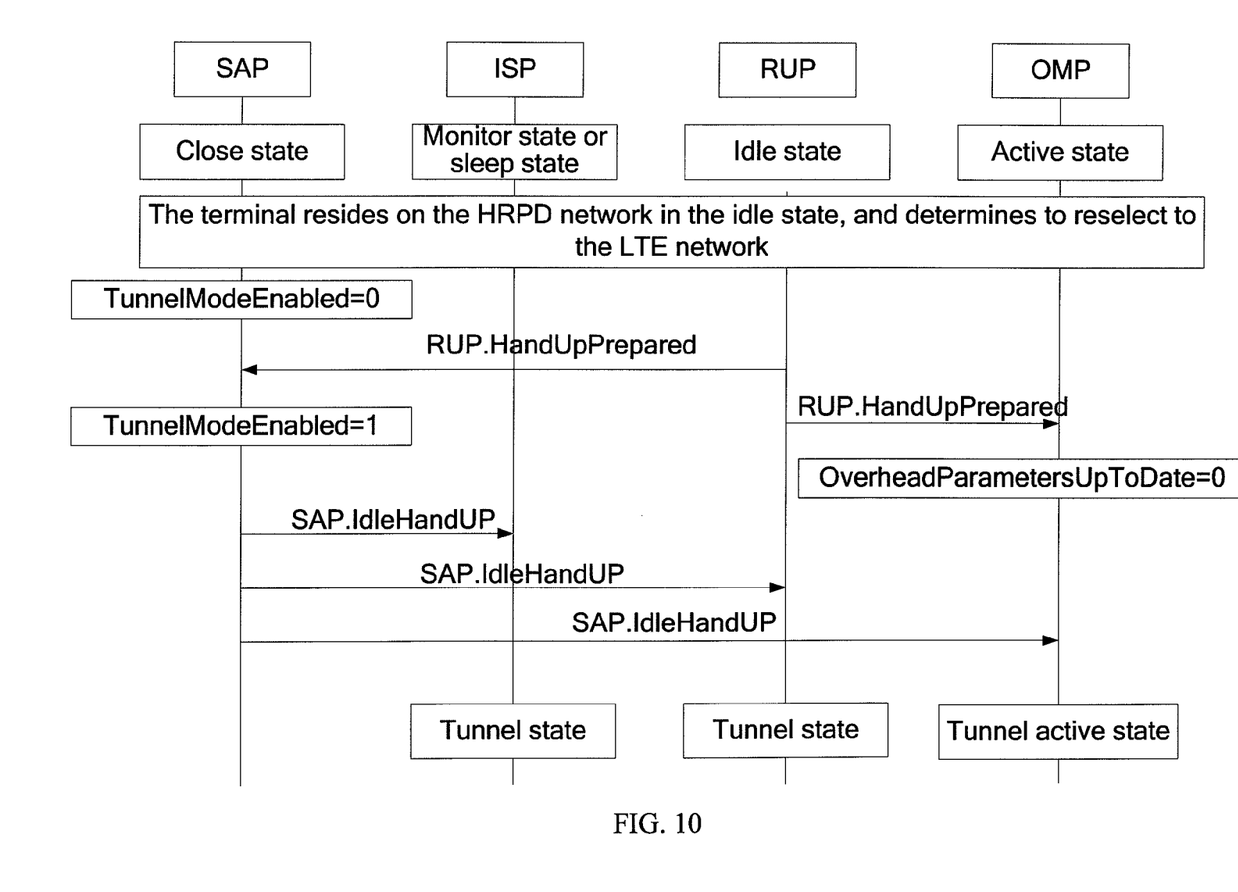
FIG. 10 illustrates the state transition in a method for transitioning of a state machine after the RAN is reselected in an embodiment.

In addition, FIG. 10 illustrates a process of the state transition of each sub-protocol in the solution. In FIG. 10, after the parameter is set to a correct value and each sub-protocol performs a state transition correctly, the terminal camps on the LTE network, and may perform the optimized handover between the LTE network and the HRPD network.

By using the method for transitioning of a state machine after the RAN is reselected in this embodiment, first information is generated when it is determined to reselect from the HRPD network to the LIE network; after the SAP receives the first information, the SAP sets the TunnelModeEnabled parameter to the first identifier, and then generates the second information; related sub protocols of the HRPD air interface receive the second information, and then enable the state machines to transition to the tunnel state. In this way, when the terminal reselects from the HRPD network to the LTE network, the states and parameters of related sub-protocols of the HRPD module can be correctly set, so as to implement the optimized handover between the HRPD network and the LTE network. Thus, the HRPD module will not be abnormal after the terminal reselects to the LTE network, ensuring that the terminal performs normal actions after the terminal reselects to the LTE network.

Another embodiment provides a method for transitioning of a state machine after the RAN is reselected. The basic steps of the method are similar to those in the preceding embodiments except for the following difference: After the ISP receives a SAP.IdleHandUP indication in the monitor state or the sleep state, the ISP transitions from the monitor state or the sleep state to the tunnel state, generates third information that may be an indication or a command, and sends the third information to the OMP. In this embodiment, the third information may be an OMP.TunnelActivate indication.

Figure 11:
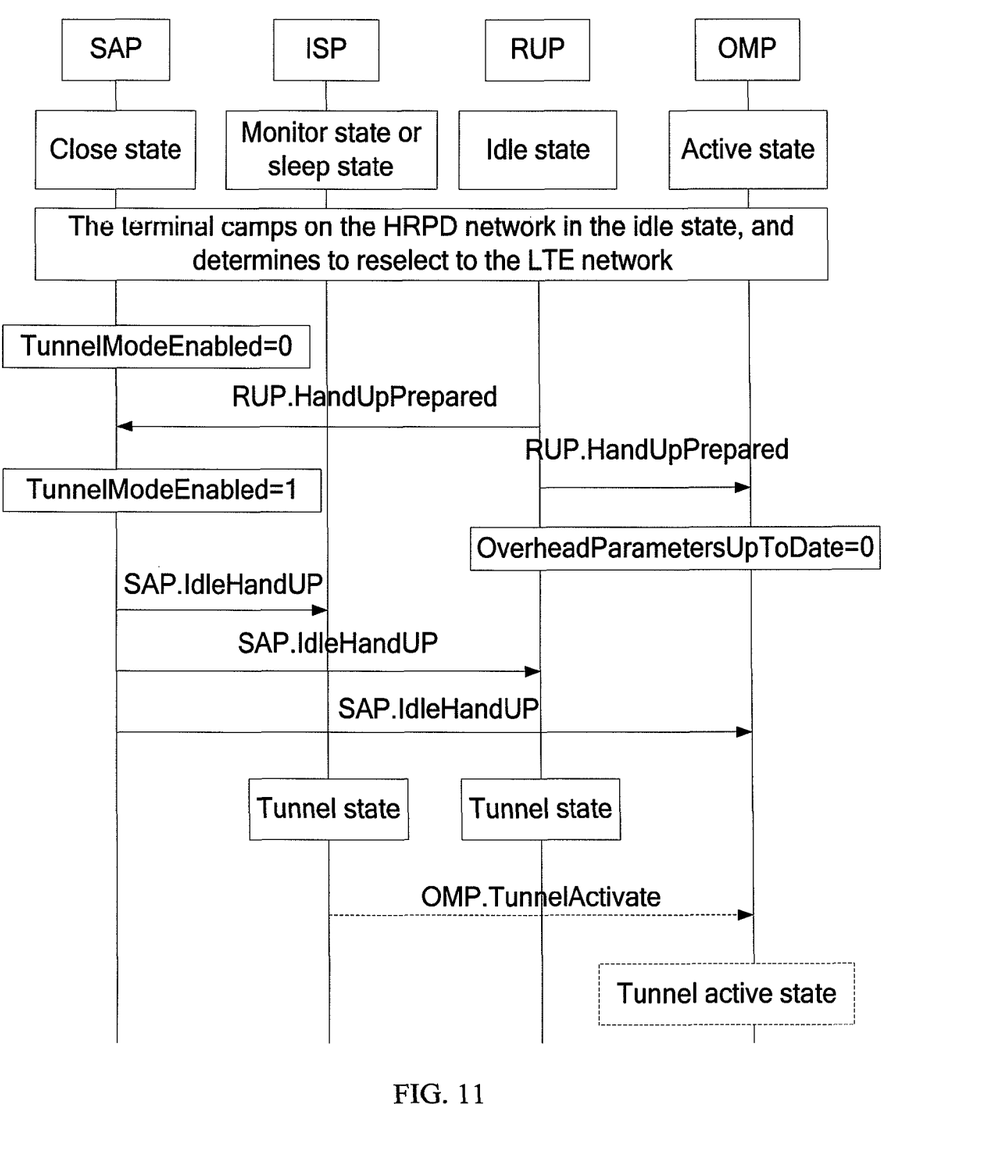
FIG. 11 illustrates the state transition in a method for transitioning of a state machine after the RAN is reselected in another embodiment.

After the OMP receives the third information (that is, the OMP.TunnelActivate indication), the OMP transitions from the active state to the tunnel active state. That is, the OMP state transition may depend on the SAP.IdleHandUP indication from the SAP or the OMP.TunnelActivate indication from the ISP, as shown by the dotted arrow in FIG. 11.

Similarly, by using the method for transitioning of a state machine after the RAN is reselected, when the terminal reselects from the HRPD network to the LTE network, the states and parameters of related sub-protocols of the HRPD module can be correctly set, so as to implement the optimized handover between the HRPD network and the LTE network. Thus, the HRPD module will not be abnormal after the terminal reselects to the LTE network, ensuring that the terminal performs normal actions after the terminal reselects to the LTE network.

Another embodiment provides a method for transitioning of a state machine after the RAN is reselected. The basic steps of the method are similar to those in the preceding embodiments except that the indication or command that instructs the RUP and ISP to enter the tunnel state is sent from other protocols such as the ALMP rather than the SAP.

Figure 12:
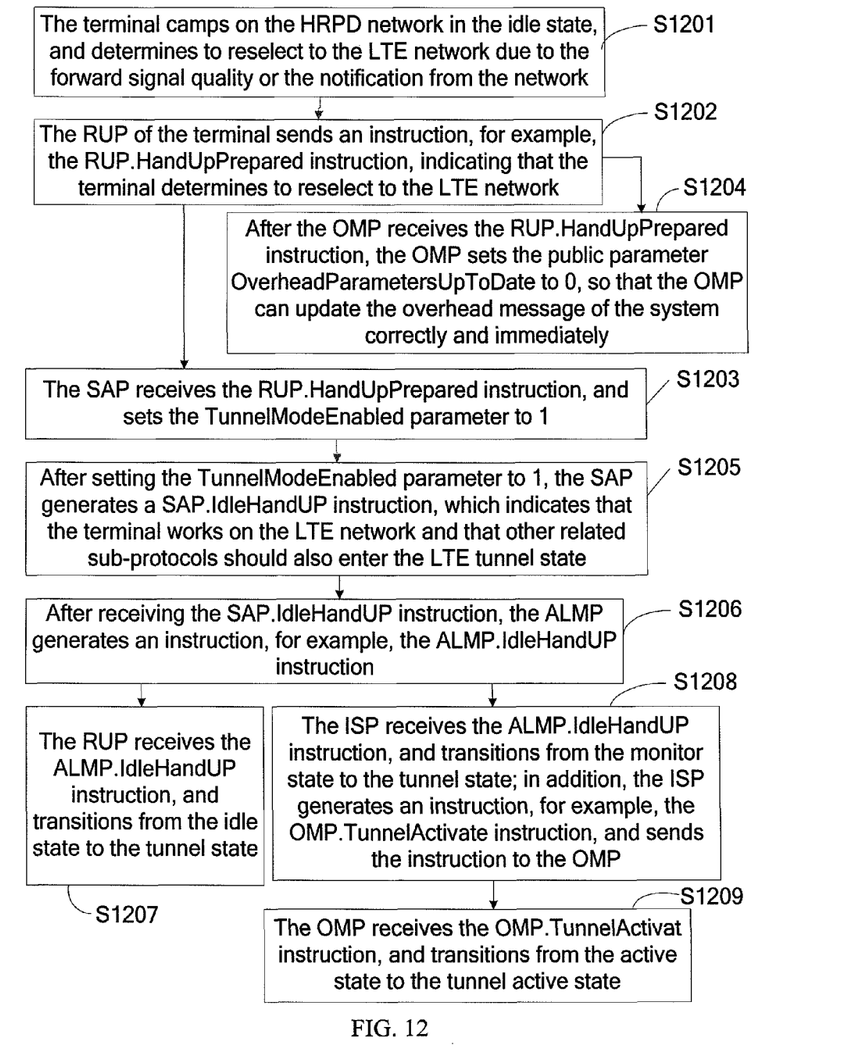
FIG. 12 illustrates the state transition in a method for transitioning of a state machine after the RAN is reselected in another embodiment.

Specifically, as shown in FIG. 12, the method includes the following steps:

Step S1201: The terminal camps on the HRPD network in the idle state, and determines to reselect to the LTE network due to the forward link signal quality or the notification from the network.

Step S1202: The RUP of the terminal sends an indication or a command, for example, a RUP.HandUpPrepared indication, indicating that the terminal determines to reselect to the LTE network.

Step S1203: The SAP receives the RUP.HandUpPrepared indication, and sets the TunnelModeEnabled parameter to 1.

When setting the TunnelModeEnabled parameter, the SAP may optionally judge the current serving RTA. Specifically, after receiving the RUP.HandUpPrepared indication, the SAP sets the TunnelModeEnabled parameter to 1 if determining that the current serving RAT is LTE.

Step S1204: After the OMP receives the RUP.HandUpPrepared indication, the OMP sets the public parameter OverheadParametersUpToDate to 0, so that the OMP can update the overhead message of the HRPD network correctly and immediately.

Step S1205: After setting the TunnelModeEnabled parameter to 1, the SAP generates a SAP.IdleHandUP indication, which indicates that the terminal will work on the LTE network and that other related sub-protocols should also enter the LTE tunnel state.

Step S1206: After receiving the SAP.IdleHandUP indication, the ALMP generates an indication or a command, for example, the ALMP.IdleHandUP indication.

Alternatively, the ALMP may also generate the ALMP.IdleHandUP indication after receiving the preceding RUP.HandUpPrepared indication.

Step S1207: The RUP receives the ALMP.IdleHandUP indication, and transitions from the idle state to the tunnel state.

Step S1208: The ISP receives the ALMP.IdleHandUP indication, and transitions from the monitor state or the sleep state to the tunnel state. In addition, the ISP generates an indication or a command, for example, the OMP.TunnelActivate indication, and sends the indication to the OMP.

Step S1209: The OMP receives the OMP.TunnelActivat indication, and transitions from the active state to the tunnel active state.

Alternatively, the OMP may also receive the ALMP.IdleHandUP indication, and transitions from the active state to the tunnel active state.

Similarly, by using the method for transitioning of a state machine after the RAN is reselected, when the terminal reselects from the HRPD network to the LTE network, the states and parameters of related sub-protocols of the HRPD module can be correctly set, so as to implement the optimized handover between the HRPD network and the LTE network. Thus, the HRPD module will not be abnormal after the terminal reselects to the LTE network, ensuring that the terminal performs normal actions after the terminal reselects to the LTE network.

Figure 13:
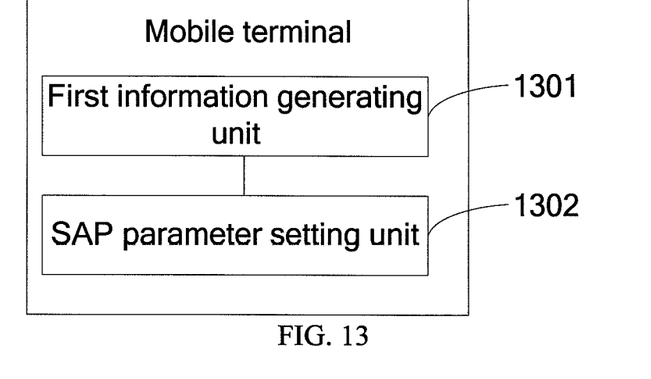
FIG. 13 is a block diagram of a structure of a mobile terminal in an embodiment.

An embodiment provides a mobile terminal. As shown in FIG. 13, the mobile terminal includes a first information generating unit 1301 and a SAP parameter setting unit 1302.

The first information generating unit 1301 is configured to generate first information when the mobile terminal reselects from the HRPD network to the LTE network. Specifically, the information may be an indication or a command. In this embodiment, the information may be the RUP.HandUpPrepared indication generated by the RUP.

The SAP parameter setting unit 1302 is configured to: receive the first information, and set the TunnelModeEnabled parameter of the SAP of the HRPD module air interface protocol to the first identifier, so that the air interface related sub-protocols of the HRPD module know that the mobile terminal has reselected to the LTE network.

Specifically, the first identifier may be 1 in this embodiment. Certainly, the first identifier may also be set to other values.

By using the mobile terminal provided in this embodiment, first information is generated when the mobile terminal reselects from the HRPD network to the LTE network; after the SAP receives the first information, the SAP sets the TunnelModeEnabled parameter to the first identifier, so that the related sub protocols of the HRPD air interface know that the mobile terminal has reselected to the LTE network. In this way, after the terminal reselects from the HRPD network to the LTE network, related sub protocols of the HRPD module can know that the terminal has reselected to the LTE network according to the TunnelModeEnabled parameter, ensuring that the terminal performs normal actions after reselecting to the LTE network.

Figure 14:
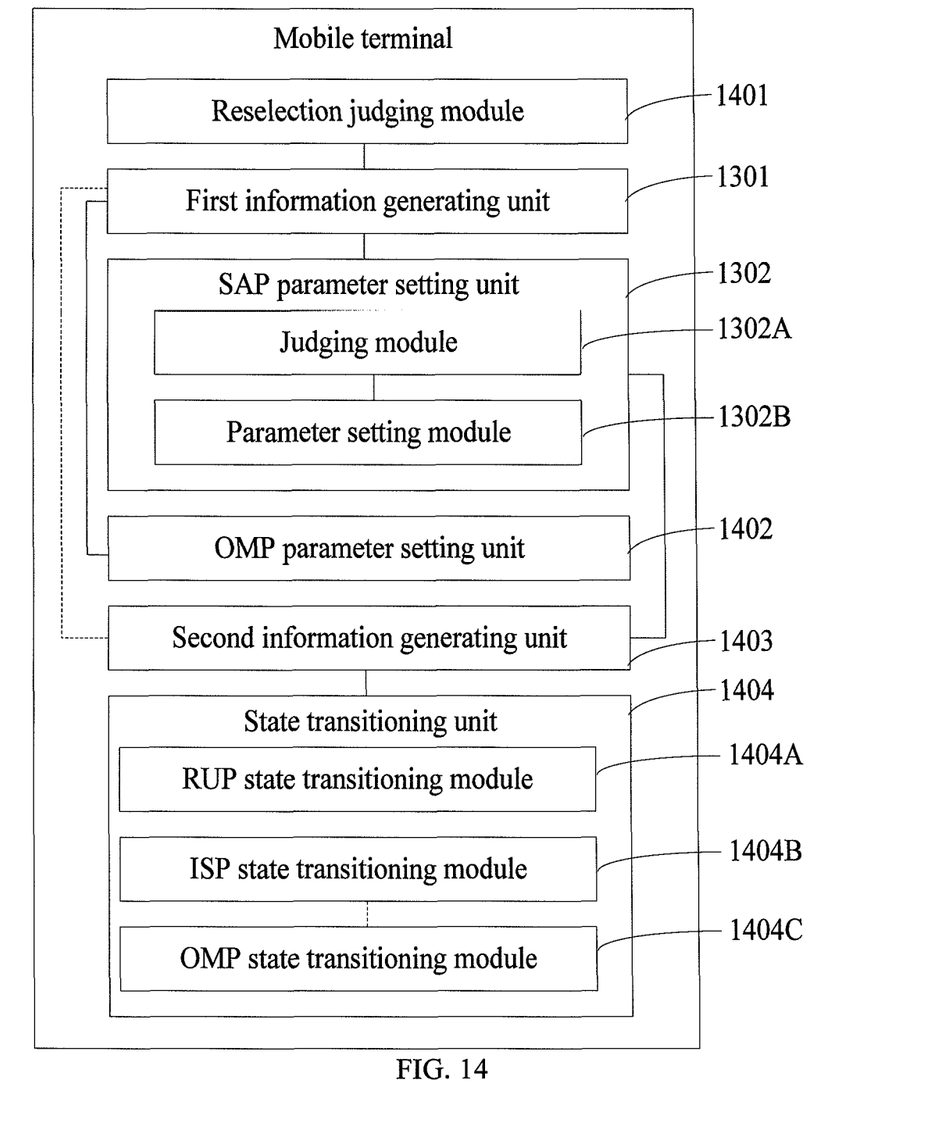
FIG. 14 is a block diagram of a structure of a mobile terminal in another embodiment.

Further, as shown in FIG. 14, the mobile terminal includes:
a reselection judging module 1401, configured to determine to reselect from the HRPD network to the LTE network according to parameter settings and measurement results of forward link signal quality on the HRPD network and the LTE network or according to the notification from the network; and
an OMP parameter setting unit 1402, configured to: receive the first information, and set the OverheadParametersUpToDate parameter to a second identifier, so that the OMP can update the overhead message of the HRPD network immediately and correctly. In this embodiment, the second identifier is 0. Certainly, the second identifier may also be set to other values.

The preceding SAP parameter setting unit 1302 further includes:
a judging module 1302A, configured to determine that the current RAT is LTE; and
a parameter setting module 1302B, configured to: after receiving the first information, set the TunnelModeEnabled parameter to the first identifier if the judging module 1302A determines that the current RAT is LTE.

The mobile terminal further includes:
a state transitioning unit 1404, configured to enable the state machines of air interface related sub-protocols of the HRPD module to transition to the tunnel state.

By using the mobile terminal provided in this embodiment, when the terminal reselects from the HRPD network to the LTE network, the states and parameters of related sub-protocols of the HRPD module can be correctly set, so as to implement the optimized handover between the HRPD network and the LTE network. Thus, the HRPD module will not be abnormal after the terminal reselects to the LTE network, ensuring that the terminal performs normal actions after the terminal reselects to the LTE network.

The mobile terminal further includes:
a second information generating unit 1403, configured to generate second information; and
the state transitioning unit 1404, further configured to: receive the second information, and enable the state machines of the air interface related sub-protocols of the HRPD module to transition to the tunnel state.
Or the state transitioning unit 1404 may be further configured to: receive the first information, and enable the state machines of the air interface related sub-protocols of the HRPD module to transition to the tunnel state.
Or the state transitioning unit 1404 may be further configured to enable the state machines of the air interface related sub-protocols of the HRPD module to transition to the tunnel state when determining that the TunnelModeEnabled parameter of the SAP is the first identifier.

The state transitioning unit 1404 further includes:
a RUP state transitioning module 1404A, configured to enable the RUP state machine to transition from the idle state to the tunnel state; or
an ISP state transitioning module 1404B, configured to enable the ISP state machine to transition from the monitor state or sleep state to the tunnel state; or
an OMP state transitioning module 1404C, configured to enable the OMP state machine to transition from the active state to the tunnel active state.

In another embodiment, the ISP state transitioning module 1404B is configured to: enable the ISP state machine to transition from the monitor state to the tunnel state, and send third information to the OMP, where the information may be an indication or a command, for example, an OMP.TunnelActivate indication.

The OMP state transitioning module 1404C is configured to: receive the third information (that is, the OMP.TunnelActivate indication) sent from the ISP, and enable the OMP state machine to transition from the active state to the tunnel active state.

By using the mobile terminal provided in this embodiment, when the terminal reselects from the HRPD network to the LTE network, the states and parameters of related sub-protocols of the HRPD module can be correctly set, so as to implement the optimized handover between the HRPD network and the LTE network. Thus, the HRPD module will not be abnormal after the terminal reselects to the LTE network, ensuring that the terminal performs normal actions after the terminal reselects to the LTE network.

The above embodiments are merely exemplary and are not intended to limit the scope of the claims. Many modification, equivalent replacements, or improvements may be made to the exemplary embodiments without departing from the scope of the claims.

What is claimed is:

1. A method for transitioning of a state machine after a radio access network (RAN) is reselected, comprising:
generating first information when a mobile terminal reselects from a high rate packet data (HRPD) network to a long term evolution (LTE) network;
setting, by a Signaling Adaptation Protocol (SAP) of the HRPD module air interface protocol, a TunnelModeEnabled parameter to a first identifier after receiving the first information, so that air interface related sub-protocols of an HRPD module know that the mobile terminal has reselected to the LTE network; and
transitioning, by state machines of air interface related sub-protocols of the HRPD module, to a tunnel state; wherein the transitioning to the tunnel state comprising:
generating, by the SAP or other HRPD module air interface protocols, second information; and
receiving, by the air interface related sub-protocols of the HRPD module, the first information or the second information, and enabling the state machines to transition to the tunnel state.

2. The method of claim 1, wherein the step of enabling the state machine of the air interface related sub-protocol to transition from a current state to a tunnel state comprises:
transitioning, by a Route Update Protocol (RUP) state machine, from an idle state to the tunnel state.

3. The method of claim 1, wherein the step of enabling the state machine of the air interface related sub-protocol to transition from a current state to a tunnel state comprises:
transitioning, by an Idle State Protocol (ISP) state machine, from a monitor state or a sleep state to the tunnel state.

4. The method of claim 1, wherein the first identifier is a digital number, the value of which equals to 1.

5. The method of claim 1, wherein the step of enabling the state machine of the air interface related sub-protocol to transition from a current state to a tunnel state comprises:

transitioning, by an Overhead Messages Protocol (OMP) state machine, from an active state to a tunnel state.

6. A mobile terminal, comprising:

a first information generating unit, configured to generate first information when the mobile terminal reselecting from a high rate packet data (HRPD) network to a long term evolution (LTE) network;

a Signaling Adaptation Protocol (SAP) parameter setting unit, configured to receive the first information, and set a TunnelModeEnabled parameter of the SAP of the HRPD module air interface protocol to a first identifier, so that air interface related sub-protocols of an HRPD module know that the mobile terminal has reselected to the LTE network;

a state transitioning unit, configured to enable state machines of the air interface related sub-protocols of the HRPD module to transition to a tunnel state; and a second information generating unit, configured to generate second information; and wherein the state transitioning unit is further configured to:

receive the first information or second information, and enable the state machines of the air interface related sub-protocols of the HRPD module to transition to the tunnel state.

7. The mobile terminal of claim 6, wherein the state transitioning unit further comprises:

a Route Update Protocol (RUP) state transitioning module, configured to enable a RUP state machine to transition from an idle state to the tunnel state.

8. The mobile terminal of claim 6, wherein the state transitioning unit further comprises:

an Idle State Protocol (ISP) state transitioning module, configured to enable an ISP state machine to transition from a monitor state or a sleep state to the tunnel state.

\* \* \* \* \*